W. Kenyon. Sheet 1. 3 Sheets.
Nut Mach.
No. 361. Reissued Mar. 18. 1856.
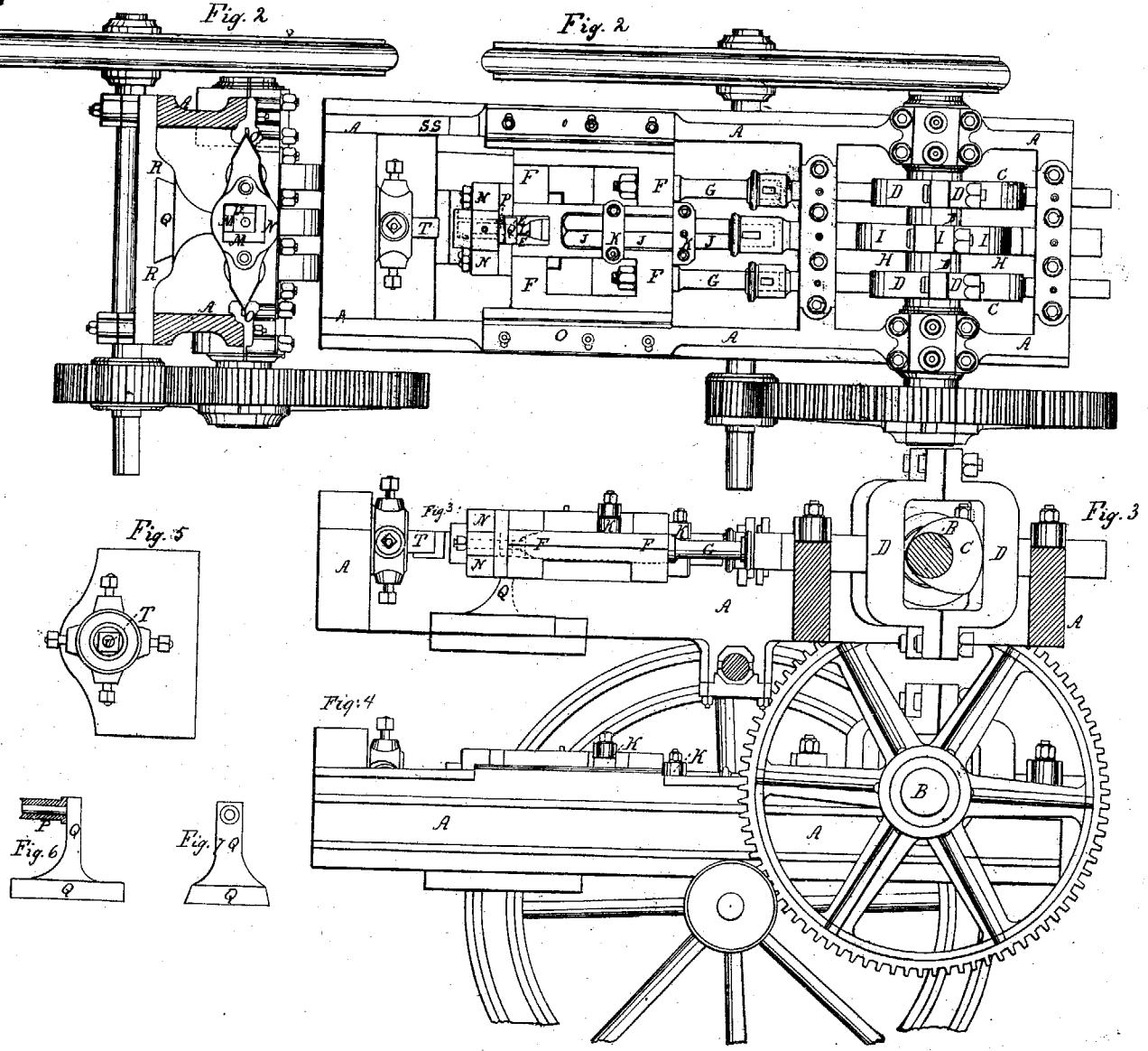

W. Kenyon. Sheet 2. 3 Sheets.

Nut Mach.

No. 361. Reissued Mar. 18, 1856

W. Kenyon. Sheet 3, 3 Sheets

Nut Mach.

No. 361. Reissued Mar. 18. 1856

UNITED STATES PATENT OFFICE.

WILLIAM KENYON, OF STEUBENVILLE, OHIO, ASSIGNOR TO JOS. P. HAIGH, ANDW. HARTUPEE, AND JNO. MORROW.

IMPROVEMENT IN MACHINES FOR MAKING NUTS, WASHERS, &c.

Specification forming part of Letters Patent No. 8,427, dated October 14, 1851; Reissue No. 361, dated March 18, 1856.

*To all whom it may concern:*

Be it known that I, WILLIAM KENYON, of Steubenville, in the county of Jefferson and State of Ohio, have invented certain new and useful Improvements in the Manufacture of Wrought-Iron Nuts for Bolts; and I do hereby declare that the following is a full, clear, and exact description thereof, reference being had to the annexed drawings, forming part of this specification, in which—

Figure 9:
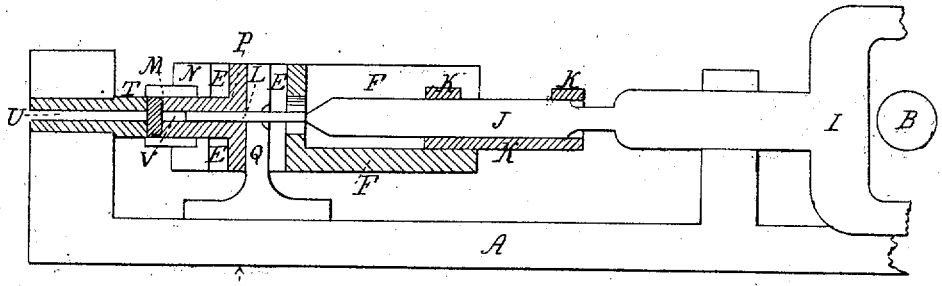
Figure 10:
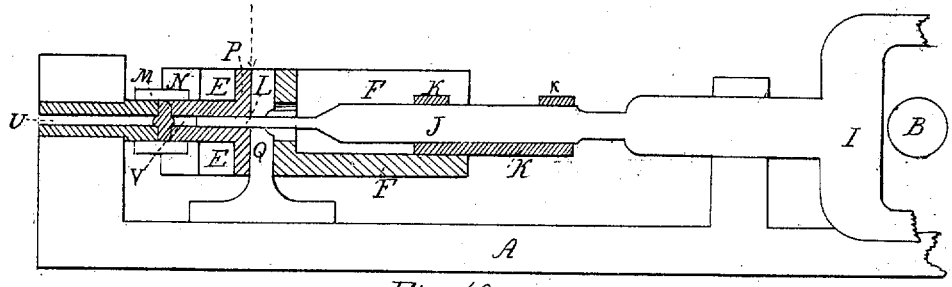
Figure 12:
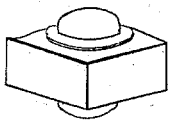
Figure 11:
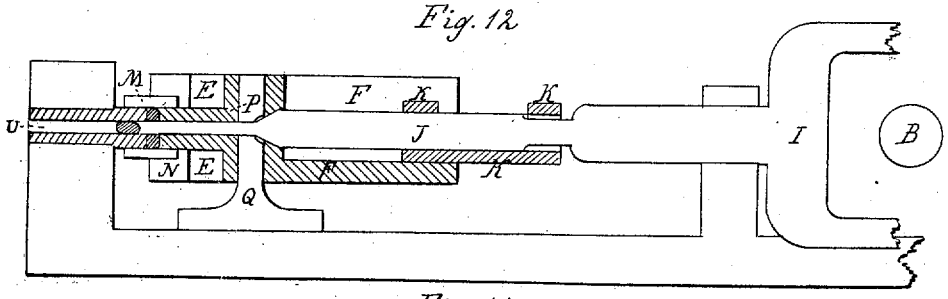
Figure 8:
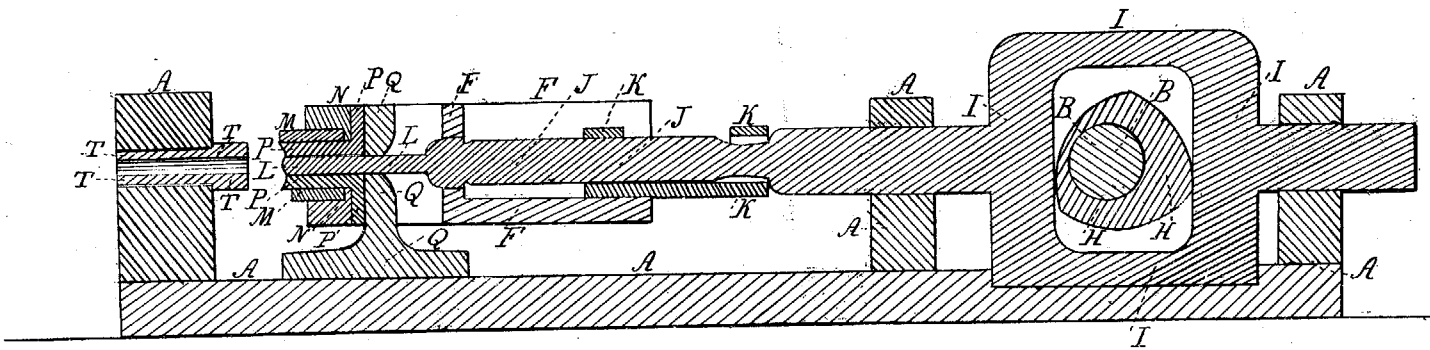

Figure 1 is a top view of my machine. Fig. 2 is an end view thereof. Fig. 3 is a section. Fig. 4 is a side elevation. Fig. 5 is an end view exhibiting the shape and position of the stationary die. Figs. 6 and 7 represent the bracket Q and moving die P. Fig. 8 is a longitudinal section of the machine through the dies and punch, (by which the nuts are made,) showing the relative position of those parts, the round punch L not being drawn fully back. Fig. 9 is a similar section showing the position of those parts shown in Fig. 8, where the blank is faced into the die-box. Fig. 10 shows the position of these parts while the blank is pressed before it is punched. Fig. 11 shows the position of those parts when the nut is punched, and before the withdrawal of the punch. Fig. 12 shows the appearance of a nut after its pressed, and before it is punched.

In the several figures like letters of reference refer to similar parts of my machine.

My invention consists in the mode hereinafter described of manufacturing nuts for screw-bolts of considerable thickness by machinery, by subjecting the blank of which the nut is to be formed at a welding-heat to compression between swages or dies in a close die-box or matrix for the purpose of welding up any imperfections in the iron and giving a uniform and symmetrical shape to the nut and punching it by forcing a punch through it while it is thus compressed, thus preventing the bursting or rending asunder of the fibers of the iron, or any other injury which the nut might sustain by the passage through it of the punch if it were not thus sustained by the sides of the die-box and forcibly compressed between the swages or dies; also, in so constructing and arranging the dies that any excess of iron in the blank shall be forced into the path of the punch and be removed by the punch without endangering the breakage of the dies or other parts of the machine, and securing the formation of nuts of nearly uniform size, density, and weight.

To enable others skilled in the art to make and use my machine, I will proceed to describe its construction and operation.

The frame-work of the machine is represented by A A, Fig. 1.

B is the cam-shaft by which the machine is operated. On the cam-shaft are three cams, placed side by side, one, H, in the center of the machine, and two others, C C, on either side of H. The cams C C are alike, of equal stroke, and work in unison.

D D are cam-yokes surrounding the outer cams, C C.

I is a similar cam-yoke surrounding the center cam, H. The outer cam-yokes, C C, are connected by rods G G to the shoving-head F, which works back and forth in the V-slides *o o*.

To the shoving-head F is attached a frame, N, holding a die-box, M, which is a strong block of steel, through which, at right angles to its face, is a hole of the precise diameter and shape of the nuts to be made by it, (whether square, hexagonal, or other required form.) The sides of this die-box are smooth and polished, so as to give a fine surface to the nuts. A movable die, P, is fitted closely into the die-box M, and when pressed forward exactly fills the die-box, as seen in Fig. 8. The face of this movable die P corresponds with the shape to be given to the lower surface of the nut. It is perforated with a round hole, V, through which works the punch L for punching the eye of the nut. The end of the moving die P rests against the bracket Q, which works in slides R R on the floor of the frame of the machine. Neither the moving die P nor the bracket Q receive motion immediately from the cams, the die P moving with the shoving-head and the die-box, excepting when it comes in contact with the bracket Q, which, projecting upward into the space E in the shoving-head back of the moving die P, remains stationary until it (the bracket) comes in contact with the shoving-head at either end of the space E. The center cam, H, is a cut-off cam, and is designed to give the round punch L a quick backward and forward motion at the moment that the nut is fully pressed, and before that pressure is discontinued.

J is a strong bar of iron connecting the cam-yoke I of the cam H with the round punch L. The punch L fits into the round hole V in the moving die P, and also into a corresponding hole, U, in the stationary die T. The bar J is sustained by and slides in rests K K, and the end of the round punch L is supported by the moving die P, in which it works.

T is a stationary punch, which fits exactly into the matrix or the die-box M, which is moved by the shoving-head F toward the stationary die T until it enters the die-box M.

I have called the "stationary die" T, and "moving die" P by those names, instead of "punch" and "mandrel," to avoid confusion, reserving the name "punch" for the round punch L for better distinction.

Having thus described the several parts of my machine, I will proceed to explain its operation and the objects it is designed to accomplish.

My machine, thus constructed, is designed to make nuts for screw-bolts out of bars of iron heated to a welding-heat by severing from the bar a blank between the die-box M and the stationary die T, forcing it into the die-box M, and while it is sustained laterally by the sides of the close die-box and on one face by the stationary die T it is squeezed or compressed by the movable die P for the purpose of compacting the fiber of the iron and welding up any imperfections existing therein, or caused by forcing the iron into the die-box, and by the continuance of the pressure during the process of punching, to secure great smoothness and finish in the eye of the nut, and prevent the straining or bursting of the nut, which would inevitably ensue if it were not thus subjected to pressure during the process of punching. It is also designed to provide for the disposal of the surplus iron without injury to the machine by allowing it to pass into the movable and stationary dies in the path of the punch, so as to be subsequently ejected with the punching, thus obviating a series difficulty which would arise if it were attempted to punch the nut first or force it over a stationary punch and then subject it to pressure around the punch, for if the bar of iron from which the nut is to be made is at all thinner than the distance between the movable and stationary dies at the point of greatest compression the nut would not be pressed at all and would be ruined by punching; or, if the bar of iron were at all too thick, the nut being pressed in a close die-box around the punch, there would be no escape for the excess of iron, and the machine would be inevitably broken or strained, or the die-box would burst when the cam passed the center, for something must give way. I accomplish these objects by the use of a movable punch, which, being partially withdrawn from the stationary die when the blank is severed from the bar of heated iron, the surplus iron is squeezed out (by the forcible pressure of the dies T and P) into the round hole in the movable and stationary dies, through which the punch is to travel, which makes the nut, before it is punched, of the shape shown in Fig. 12, with a projection or nipple on either or both sides, where the eye is to be, which is subsequently removed by the punch in forming the eye. Thus I am enabled by the use of iron which is a little over thick to insure the requisite amount of pressure on my nuts, which cannot be accomplished where the safety of the machine requires an exact quantity of iron. This plan also serves to give vent for any fixed air or the coarser particles of metal which may be squeezed into the core and removed in the punching, and the blank thus tightly compressed in the close die-box and between the dies cannot be strained, burst, or otherwise injured by the passage of the punch through it. The use of a movable instead of a stationary punch also obviates the difficulty of the softening of the punch by overheating, which would occur if the hot nut were forced over and pressed around it in the first instance.

The operation of my machine is as follows: When the several parts are in the position shown in Fig. 8, excepting that the round punch L is partially drawn back in the movable die P, the die-box M being drawn back from the stationary die T by its shoving-head F, and the movable die P being forced up into the die-box M, until its face is even with the face of the die-box, by the bracket Q, (which cannot recede, because it is pressed as far back as it can go by the die-box M,) the end of a bar of iron at a welding-heat is placed in the slot *s*, in front of the die-box M, and lying on the face of the movable die P. A partial revolution of the cam-shaft B causes the outer cams, C C, to advance the shoving-head F, and with it the die-box M, toward the stationary die T. The brachet Q remains stationary, while the die-box M advances from contact with it toward the stationary die T, until it brings the heated bar of iron in contact with the stationary die T. The die-box M (still advancing) forces the blank severed from the heated bar by the edge of the stationary die T and die-box M to enter the die-box M, the blank being sustained by the movable die P, and thus prevented from turning or getting out of place in the die-box M. As the blank enters the die-box M the movable die P apparently recedes, but is really stationary, while the die-box M is advancing, the movable die P being still sustained by the bracket Q. When the blank has fully entered the die-box M, the stationary die T also enters it. At this point (shown in Fig. 9) the shoving-head F has advanced so far toward the stationary die T that the rear edge of the space E now touches the bracket Q, and the shoving-head F, still advancing with the die-box M, presses the bracket Q also forward, causing the movable die P to advance in the die-box M toward the stationary die T, and now the pressure of the blank between the dies T and P inside the close die-box M commences and continues until the shoving-head F has caused the bracket Q to advance from point marked 1 to 2 in Fig. 10.

It will be seen by examining Fig. 10 that the advancing of the die-box M when the nut is being pressed does not cause the movable die P to advance in it, and that it is only when the shoving-head F presses against the bracket Q that this effect is produced. The blank being thus strongly squeezed or compressed between the dies T and P, while its sides are sustained by the sides of the die-box M, the surplus metal is forced into the holes in the dies T and P, being the path of the punch L. The center cam, H, at this point begins to act on the bar J, giving it a rapid backward and forward motion, thus causing the sudden passage of the punch L through the moving die P, and through the blank into the stationary die T, while the compression of the blank between the dies and the die-box is still continued. The "punching" is forced through the stationary die T and discharged through the round hole U. The punch is then as suddenly withdrawn to prevent its becoming heated by contact with the hot metal, and then, and not till then, the pressure on the nut is relieved by the receding of the shoving-head F, which is drawn back by the cams C C. The finished nut is then discharged from the die-box as follows: The back of the movable die P projecting from the die-box M behind and resting against the bracket Q, causes the bracket Q to recede as far back as it can go. The bracket Q and die P then of course remain stationary, but the die-box M still receding with its shoving-head F, the bracket Q forces the movable die P up in the die-box until it comes even with the face of the die-box, when the nut drops out, the machine assuming its first position.

The operation just described is performed in one revolution of the cam-shaft B, which may be made to revolve as rapidly as the iron bar can be fed in.

I have described my machine with dies working horizontally; but it is manifest that it may be arranged to work perpendicularly, if preferred, or the punch be made to move through the stationary instead of the movable die without altering the principle or impairing the action of my machine.

What I claim as my invention, and desire to secure by Letters Patent, is—

1. The use of the die T and die-box M for severing the blank, the close die-box, in combination with the dies and bracket Q for pressing, and the punch L for perforating, the same during the pressure, the whole operating conjointly, as herein described, for making nuts or washers at one operation.

2. The manner, substantially hereinbefore described, of so arranging the dies in relation to the punch that any excess of iron in the blank shall be forced into the path of the punch, thus securing the compression of the nut without risking the breaking of the machine.

WILLIAM KENYON.

Witnesses:
JAMES W. KENNEY,
ROBERT SHERRARD, Jr.